US011674044B2

(12) United States Patent
Robincheck et al.

(10) Patent No.: US 11,674,044 B2
(45) Date of Patent: Jun. 13, 2023

(54) PRECURSORS FOR FORMING HETEROPHASIC ODOR-ABSORBING AND ANTI-FOULING POLYMERIC COATINGS

(71) Applicant: GM GLOBAL TECHNOLOGY OPERATIONS LLC, Detroit, MI (US)

(72) Inventors: Janet C. Robincheck, Sterling Heights, MI (US); Adam F. Gross, Santa Monica, CA (US); Kaitlin Albanese, Oxnard, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 734 days.

(21) Appl. No.: 16/716,029

(22) Filed: Dec. 16, 2019

(65) Prior Publication Data

US 2021/0179861 A1 Jun. 17, 2021

(51) Int. Cl.
| | |
|---|---|
| C09D 5/16 | (2006.01) |
| C09D 127/16 | (2006.01) |
| C09D 127/18 | (2006.01) |
| C09D 105/02 | (2006.01) |
| C09D 7/63 | (2018.01) |
| C09D 7/48 | (2018.01) |
| C09D 129/04 | (2006.01) |
| C08K 3/013 | (2018.01) |
| C08K 5/17 | (2006.01) |
| C08L 5/16 | (2006.01) |
| C08L 27/12 | (2006.01) |
| C08K 5/00 | (2006.01) |

(52) U.S. Cl.
CPC ............... *C09D 5/16* (2013.01); *C08K 3/013* (2018.01); *C08K 5/0025* (2013.01); *C08K 5/0066* (2013.01); *C08K 5/17* (2013.01); *C08L 5/16* (2013.01); *C08L 27/12* (2013.01); *C09D 7/48* (2018.01); *C09D 7/63* (2018.01); *C09D 105/02* (2013.01); *C09D 127/16* (2013.01); *C09D 127/18* (2013.01); *C09D 129/04* (2013.01); *C08L 2201/54* (2013.01); *C08L 2207/02* (2013.01)

(58) Field of Classification Search
CPC ... C09D 5/16; C09D 7/48; C09D 7/63; C09D 105/02; C09D 127/16; C09D 127/18; C09D 129/04; C08K 3/013; C08K 5/0025; C08K 5/0066; C08K 5/17; C08L 5/16; C08L 27/12; C08L 2201/54; C08L 2207/02
USPC ...................................................... 106/205
See application file for complete search history.

(56) References Cited

U.S. PATENT DOCUMENTS

| | | | |
|---|---|---|---|
| 5,534,165 A | 7/1996 | Pilosof et al. | |
| 5,942,217 A | 8/1999 | Woo et al. | |
| 6,992,132 B2 | 1/2006 | Trombetta et al. | |
| 10,442,935 B2 | 10/2019 | Nelson et al. | |
| 10,570,292 B1 | 2/2020 | Rodriguez et al. | |
| 11,098,204 B2 | 8/2021 | Rodriguez et al. | |
| 11,421,114 B2 | 8/2022 | Drummey et al. | |
| 2017/0322345 A1 | 11/2017 | Takada et al. | |
| 2019/0382578 A1 | 12/2019 | Rodriguez et al. | |

FOREIGN PATENT DOCUMENTS

| | | | |
|---|---|---|---|
| CN | 112981972 A | 6/2021 | |
| DE | 102007043323 A1 * | 3/2009 | ......... C08B 37/0012 |
| DE | 102020131648 A1 | 6/2021 | |
| WO | 2009033635 A2 | 3/2009 | |
| WO | WO-2022260138 A1 * | 12/2022 | |

OTHER PUBLICATIONS

Rodriguez, April R. et al., U.S. Appl. No. 16/011,176, filed Jun. 18, 2018 entitled "Fluorine-Containing Additives for Non-Fluoro Thermoplastic Polymers," 34 pages.
Rodriguez, April R. et al., U.S. Appl. No. 16/155,341, filed Oct. 9, 2018 entitled "Heterophasic Anti-Fouling, Solvent-Borne Polymeric Coating Having a Fluorinated Continuous Phase With Non-Fluorinated Domains," 55 pages.
Akhmatskaya, E. et al, "Dynamic modeling of the morpholoy of multiphase waterborne polymer particles" Colloid and Polymer Science 2013, 291 (1), 87-98.
Chevalier, Y. et al., "Structure of Waterborne Organic Composite Coatings" Macromolecules 1999, 32 (23), 7887-7896.
Del Amo, B. et al., "High performance water-based paints with non-toxic anticorrosive pigments" Progress in Organic Coatings 2002, 45 (4), 389-397.
Folch-Cano, Christian et al., "Inlcusion and Functionalization of Polymers with Cyclodextrins: Current Applications and Future Prospects," Molecules (2014) 19, pp. 14066-14079 (Published Sep. 9, 2014); DOI: 10.3390/molecules190914066.
Goikoetxea, M. et al, "Polymerization Kinetics and Microstructure of Waterborne Acrylic/Alkyd Nanocomposites Synthesized by Miniemulsion" Journal of Polymer Science Part A: Polymer Chemistry 2009, 47 (19), 4871-4885.

(Continued)

*Primary Examiner* — Kelechi C Egwim
(74) *Attorney, Agent, or Firm* — Harness, Dickey & Pierce, P.L.C.

(57) ABSTRACT

An aqueous or water-borne precursor liquid for forming an odor-absorbing and anti-fouling heterophasic thermoset polymeric coating is provided. The precursor includes a fluorine-containing polyol precursor having a functionality >about 2 that forms a branched fluorine-containing polymer component defining a first phase in the anti-fouling heterophasic thermoset polymeric coating. The precursor also includes a first precursor that forms a first component including a cyclodextrin present as second phase. The first phase can be a continuous phase and the second phase can be a first discrete phase, or the second phase can be the continuous phase and the first phase can be the first discrete phase. A crosslinking agent, water, and optional acid or base are also present. An emulsifier may also be included. Methods of making an odor-absorbing and anti-fouling heterophasic thermoset polymeric coatings with such precursors are also provided.

20 Claims, 2 Drawing Sheets

(56) References Cited

OTHER PUBLICATIONS

Kawahara, H. et al., "Preparation of Epoxy Resin/Acrylic Composite Latexes by Miniemulsion Polymerization Method" Journal of Applied Polymer Science 2001, 81 (1), 128-133.

Overbeek, A., "Polymer heterogeneity in waterborne coatings," J. Coat. Technol. Res, 7 (1) (2010), pp. 1-21; DOI: 101007/s11998-009-9201-5.

Stubbs, J. M. et al., "Core-shell and other multiphase latex particles-confirming their morphologies and relating those to synthesis variables," J. Coat. Technol. Res., 5 (2) (2008), pp. 169-180; DOI: 10.1007/a11998-007-9060-x.

Tielemans, M. et al., "Multiphase coatings from complex radiation curable polyurethane dispersions" Progress in Organic Coatings 2012, 75 (4), 560-568.

Rodriguez, April R. et al., U.S. Appl. No. 16/155,347, filed Oct. 9, 2018 entitled "Water-Borne Precursors for Forming Heterophasic Anti-Fouling, Polymeric Coatings Having a Fluorinated Continuous Phase With Non-Fluorinated Domains," 59 pages.

German Office Action dated Mar. 4, 2021 (corresponding to DE 10 2020 131 648.8).

\* cited by examiner

PRECURSORS FOR FORMING HETEROPHASIC ODOR-ABSORBING AND ANTI-FOULING POLYMERIC COATINGS

This section provides background information related to the present disclosure which is not necessarily prior art.

The present disclosure relates generally to a heterophasic thermoset polymeric coating derived from a water-borne mixture (e.g., suspension or solution) and more specifically to a water-borne precursor that can be used to treat an article to form the heterophasic thermoset polymer coating that includes a first phase having a fluorine-containing polymer component and a second phase comprising a first component.

Surfaces of various materials, such as plastics, metals, sensors, fabrics, leather, and glass, can become soiled from debris (e.g., particles, oils, dust, insects), especially in automotive applications. These surfaces can also absorb undesirable odors from the air and debris. The debris can affect not only aesthetics of surfaces, but also performance where the surfaces are functional. For example, if the material is a plastic or metal component present on the exterior of an automobile, the presence of debris can affect the airflow over the surface. Further, performance of surfaces of sensors can be detrimentally impacted by the presence of debris or foreign objects. Thus, it is desirable to formulate odor-absorbing, self-cleaning, anti-fouling and/or "debris-phobic" coatings or surfaces that can absorb odors and remove the debris by, for example, controlling chemical interactions between the odor molecules and/or the debris and the surface.

Odors can be controlled by steam cleaning or wet vacuuming the affected surface, spraying an aqueous odor absorber on the affected surface, or using a solid absorber, such as activated charcoal. While, steam cleaning or wet vacuuming can be effective, such treatments can only be performed intermittently, which leaves the odor remaining on the surface in between treatments. Spraying an aqueous odor absorber on an affected surface can lead to further staining of the surface because the aqueous odor absorber can also absorb debris that causes staining. In addition, solid absorbers are present below the surface; thus, they do not protect surfaces from debris and can only capture odors that are emitted from the surfaces over time.

Various debris-phobic and self-cleaning surfaces include, for example, superhydrophobic and superoleophobic surfaces, fluoropolymer sheets or treated surfaces, fluorofluid filled surfaces, and enzyme filled coatings, by way of example. Superhydrophobic and superoleophobic surfaces can create high contact angles (e.g., greater than 150°) via a nanostructure between the surface and water and oil drops, respectively, resulting in the drops rolling off the surface rather than remaining on the surface. However, these surfaces do not absorb odors and do not repel solid foreign matter or contaminant vapors, which can absorb onto the surface and render it ineffective. Solids can remain and interfere with rejection of fluids on these surfaces and odors can absorb in and re-emit over time, which is undesirable. Furthermore, over time, the extreme wettability of these surfaces can fade due to environmental exposure or damage, for example, these surfaces can lose functionality (e.g., these surfaces can also lose function if the nanostructured top surface is scratched).

Low surface energy polymers, such as those containing low surface energy perfluoropolyethers and perfluoroalkyl groups, have been explored for low adhesion and solvent repellent applications. While these low-surface energy polymers can facilitate release of materials adhering to them in both water and air, they do not necessarily provide a lubricated surface to promote clearing of foreign matter nor do they reduce odors. While fluoropolymer sheets or treated surfaces have low surface energies and thus low adhesion force between foreign matter and the surface, removal of all soils from the surface is thus problematic.

Thus, there remains a need for odor-absorbing surface coatings, which can reduce the effect of odor upon contact of the surface with the odor molecules. Furthermore, there is a need for such odor-absorbing surface coatings to also be self-cleaning and anti-fouling, which can both prevent and reduce adhesion of debris, including solids and fluids. Moreover, it would be desirable to have precursors for making such anti-fouling and odor-absorbing surface coatings that have reduced volatile organic compounds, including reduced amounts of non-aqueous solvents.

SUMMARY

This section provides a general summary of the disclosure, and is not a comprehensive disclosure of its full scope or all of its features.

In various aspects, the present disclosure provides an aqueous precursor liquid for forming an odor absorbing and anti-fouling heterophasic thermoset polymeric coating. The aqueous precursor liquid includes a fluorine-containing precursor having a functionality greater than about 2 that forms a fluorine-containing polymer component defining a first phase in the anti-fouling heterophasic thermoset polymeric coating. The aqueous precursor liquid also includes a first precursor that forms a first component including a cyclodextrin, wherein the first component defines a second phase in the odor-absorbing and anti-fouling heterophasic thermoset polymeric coating. The aqueous precursor liquid also includes a crosslinking agent comprising a moiety selected from the group consisting of an amine moiety, a hydroxyl moiety, an isocyanate moiety, and a combination thereof. The crosslinking agent is capable of bonding at least a portion of the fluorine-containing polymer component in the first phase with at least a portion of the first component in the second phase. The aqueous precursor liquid also includes water and optionally, an acid or a base. The first phase is a continuous phase and the second phase is a first discrete phase within the continuous phase, wherein the first discrete phase includes a plurality of first domains each having an average size of greater than or equal to about 100 nm to less than or equal to about 5,000 nm. Alternatively, the second phase is the continuous phase and the first phase is the first discrete phase within the continuous phase, wherein the first discrete phase includes a plurality of first domains each having an average size of greater than or equal to about 100 nm to less than or equal to about 5,000 nm.

The fluorine-containing polymer component including a fluoropolymer selected from the group consisting of a polyvinylidene fluoride copolymer, a polyfluoroacrylate, a polytetrafluoroethylene copolymer, a fluorinated polyol, a perfluorocarbon, a perfluoropolyether, a polyfluorosiloxane, a polyvinylidene fluoride, a polytrifluoroethylene, and a combination thereof. The cyclodextrin is selected from the group consisting of α-cyclodextrin, β-cyclodextrin, hydroxypropyl-β-cyclodextrin, methyl-β-cyclodextrin, and a combination thereof.

The aqueous precursor liquid further includes a second precursor that forms a second component present: (i) in the second phase; (ii) as a third phase including a plurality of second domains each having an average size of greater than or equal to about 100 nm to less than or equal to about 5,000 nm defining a second discrete phase within the continuous phase in the odor-absorbing and anti-fouling heterophasic thermoset polymeric coating; or (iii) a combination thereof.

The second component is selected from the group consisting of a hygroscopic polymer, a hydrophobic polymer that is not lipophobic, an ionic hydrophilic precursor, an amphiphilic polymer, and a combination thereof. The hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. The hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. The ionic hydrophilic precursor includes a pendant carboxylate group, an amine group, a sulfate group, a phosphate group, and a combination thereof. The amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)-polylactic acid (PLA) diblock polymer, polyethylene glycol (PEG)-poly(lactic-co-glycolic acid) (PLGA) diblock polymer, polyethylene glycol (PEG)-polycaprolactone (PCL) diblock polymer, polyethylene glycol (PEG)-polyethylene (PE) diblock polymer, and polyethylene glycol (PEG)-polystyrene (PS) diblock polymer, and a combination thereof.

The aqueous precursor liquid can have a cloud point of less than or equal to 80° C.

The aqueous precursor liquid can include a first mixture including the first precursor and the crosslinking agent. The first mixture can have a pH of about 2 to about 8. The aqueous precursor liquid can further include a separate second mixture including the fluorine-containing precursor. The second mixture can have a pH of about 2 to about 6.

The aqueous precursor liquid can further include at least one agent selected from the group consisting of an emulsifier, a catalyst, an anti-oxidant, a hindered amine stabilizer, a particulate filler, a pigment, a dye, a plasticizer, a flame retardant, a flattening agent, an adhesion promotor, an acid, a base, an anti-bacterial agent, an anti-fungal agent, and a combination thereof.

In yet other aspects, a method of treating an article is provided herein. The method includes applying an aqueous precursor liquid to a surface of the article and solidifying the aqueous precursor liquid to form an odor-absorbing and anti-fouling thermoset polymeric coating on the surface of the article. The aqueous precursor liquid includes a fluorine-containing precursor having a functionality greater than about 2, a first precursor, a crosslinking agent including a moiety selected from the group consisting of an amine moiety, a hydroxyl moiety, an isocyanate moiety, and a combination thereof, water, and optionally, an acid or a base. The odor-absorbing and anti-fouling thermoset polymeric coating includes a first phase including a fluorine-containing polymer formed from the fluorine-containing precursor and a second phase including a first component formed from the first precursor. The first component includes a cyclodextrin, and the first component is substantially immiscible with the fluorine-containing polymer. At least a portion of the fluorine-containing polymer in the first phase and at least a portion of the first component in the second phase are bonded together with a moiety selected from the group consisting of a nitrogen-containing moiety, an oxygen-containing moiety, an isocyanate-containing moiety, and a combination thereof. The first phase may be a continuous phase and the second phase may be a first discrete phase within the continuous phase, wherein the first discrete phase comprises a plurality of first domains each having an average size of greater than or equal to about 100 nm to less than or equal to about 5,000 nm. Alternatively, the second phase may be the continuous phase and the first phase may be the first discrete phase within the continuous phase, wherein the first discrete phase includes a plurality of first domains each having an average size of greater than or equal to about 100 nm to less than or equal to about 5,000 nm.

The first phase includes a fluoropolymer selected from the group consisting of a polyvinylidene fluoride copolymer, a polyfluoroacrylate, a polytetrafluoroethylene copolymer, a perfluoropolyether, a polyfluorosiloxane, a polytrifluoroethylene, and a combination thereof. The cyclodextrin is selected from the group consisting of α-cyclodextrin, β-cyclodextrin, hydroxypropyl-β-cyclodextrin, methyl-β-cyclodextrin, and a combination thereof.

The aqueous precursor liquid can further include a second precursor. The an odor-absorbing and anti-fouling thermoset polymeric coating can further include a second component present: (i) in the second phase; (ii) as a third phase including a plurality of second domains each having an average size of greater than or equal to about 100 nm to less than or equal to about 5,000 nm defining a second discrete phase within the continuous phase; (iii) a combination thereof. At least a portion of the fluorine-containing polymer in the first phase is bonded with at least a portion of the first component in the second phase, at least a portion of the second component in the third phase, or a combination thereof, via a moiety selected from the group consisting of a nitrogen-containing moiety, an oxygen-containing moiety, an isocyanate-containing moiety, and a combination thereof.

The second component is selected from the group consisting of a hygroscopic polymer, a hydrophobic polymer that is not lipophobic, an ionic hydrophilic precursor, an amphiphilic polymer, and a combination thereof. The hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. The hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. The ionic hydrophilic precursor includes a pendant carboxylate group, an amine group, a sulfate group, a phosphate group, and a combination thereof. The amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)-polylactic acid (PLA) diblock polymer, polyethylene glycol (PEG)-poly(lactic-co-glycolic acid) (PLGA) diblock polymer, polyethylene glycol (PEG)-polycaprolactone (PCL) diblock polymer, polyethylene glycol (PEG)-polyethylene (PE) diblock polymer, and polyethylene glycol (PEG)-polystyrene (PS) diblock polymer, and a combination thereof.

The crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked isocyanates, carbodiimide crosslinkers, and a combination thereof. The aqueous precursor liquid optionally includes a catalyst selected from the group consisting of: dibutyl tin dilaurate, dimethyltin dineodecanoate, dioctyltin dineodecanoate, dioctyltin dilaurate, tin octoate, bismuth neodecanoate, bismuth octoate, and a combination thereof.

The surface of the article includes a material selected from the group consisting of glass, plastic, fabric, textile, yarn, leather, surface, paint, and a combination thereof.

The method may further include preparing the aqueous precursor liquid by mixing the fluorine-containing precursor, wherein the fluorine-containing precursor is waterborne, with the first precursor, water, the crosslinking agent, optionally a second precursor, and an optional catalyst. The method may optionally include adjusting the pH of the aqueous precursor liquid to about 2 to about 8. Alternatively, the aqueous precursor liquid may be prepared by emulsifying a water-borne fluorine-containing precursor with water and an emulsifier component to form the aqueous precursor liquid including the fluorine-containing precursor and mixing the aqueous precursor liquid with the first precursor, water, the crosslinking agent, optionally the second precursor, and an optional catalyst, and optionally adjusting the pH of the aqueous precursor liquid to about 2 to about 8. Alternatively, the aqueous precursor liquid may be prepared by reacting the fluorine-containing precursor, wherein the fluorine-containing precursor is water-borne, with a hydrophilic moiety, an ionic moiety, or a combination thereof to form a fluoropolymer and mixing the fluoropolymer with the first precursor, water, the crosslinking agent, optionally the second precursor, and an optional catalyst, and optionally adjusting the pH of the aqueous precursor liquid to about 2 to about 8. Alternatively, the aqueous precursor liquid may be prepared by reacting the first precursor with the second precursor to form a oligomer precursor and mixing the fluorine-containing precursor, wherein the fluorine-containing precursor is water-borne, with the oligomer precursor, water, the crosslinking agent, and an optional catalyst, and optionally adjusting the pH of the aqueous precursor liquid to about 2 to about 8.

The aqueous precursor liquid may include a first mixture and a separate second mixture including the fluorine-containing precursor. The first mixture may be formed by reacting the first precursor with a nonionic surfactant. The second mixture may be applied to a surface of the article and solidified to form a first coating and the first mixture may be reacted onto the first coating. Alternatively, the first mixture and the second mixture can be combined to form a third mixture and the third mixture can be applied to the surface of the article and solidified.

In yet other aspects, a heterophasic thermoset polymeric coating is provided herein. The heterophasic thermoset polymeric coating includes a first phase and a second phase. The first phase includes a fluorine-containing polymer component formed from at least one fluorine-containing precursor having a functionality of greater than 2. The second phase includes first component including a cyclodextrin. The first component is formed from a first precursor and the first component is substantially immiscible with the fluorine-containing polymer component. At least a portion of the first component in the second phase is bonded together with a moiety selected from the group consisting of a nitrogen-containing moiety, an oxygen-containing moiety, an isocyanate-containing moiety, and a combination thereof. The heterophasic thermoset polymeric coating is formed from an aqueous precursor including water, the fluorine-containing precursor, and the first precursor. The first phase may be a continuous phase and the second phase may be a first discrete phase within the continuous phase. The first discrete phase includes a plurality of first domains each having an average size of greater than or equal to about 100 nm to less than or equal to about 5,000 nm. Alternatively, the second phase may be the continuous phase and the first phase may be the first discrete phase within the continuous phase.

The fluorine-containing polyol includes a polyol fluoroacrylate or a polyol copolymer of polyvinylidene difluoride.

The heterophasic thermoset polymeric coating scatters between about 10% and about 50% of incident light.

The fluorine-containing polymer component includes a fluoropolymer selected from the group consisting of a polyvinylidene fluoride, a polyfluoroacrylate, a polytetrafluoroethylene copolymer, a fluorinated polyol, a perfluorocarbon, a perfluoropolyether, a polyfluorosiloxane, a polytrifluoroethylene, and a combination thereof. The cyclodextrin is selected from the group consisting of α-cyclodextrin, β-cyclodextrin, hydroxypropyl-β-cyclodextrin, methyl-β-cyclodextrin, and a combination thereof.

The heterophasic thermoset polymer coating can further include a second component formed from a second precursor. The second component is present: (i) in the second phase; (ii) as a third phase including a plurality of second domains each having an average size of greater than or equal to about 100 nm to less than or equal to about 5,000 nm defining a second discrete phase within the continuous phase; or (iii) a combination thereof. The second component is selected from the group consisting of a hygroscopic polymer, a hydrophobic polymer that is not lipophobic, an ionic hydrophilic precursor, an amphiphilic polymer, and a combination thereof. The hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof. The hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof. The ionic hydrophilic precursor includes a pendant carboxylate group, an amine group, a sulfate group, a phosphate group, and a combination thereof. The amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)-polylactic acid (PLA) diblock polymer, polyethylene glycol (PEG)-poly(lactic-co-glycolic acid) (PLGA) diblock polymer, polyethylene glycol (PEG)-polycaprolactone (PCL) diblock polymer, polyethylene glycol (PEG)-polyethylene (PE) diblock polymer, and polyethylene glycol (PEG)-polystyrene (PS) diblock polymer, and a combination thereof. At least a portion of the fluorine-containing polymer in the first phase is bonded with: (i) at least a portion of the first component in the second phase, (ii) at least a portion of the second component in the second phase and/or the third phase, (iii) or a combination thereof, via a moiety selected from the group consisting of a nitrogen-containing moiety, an oxygen-containing moiety, an isocyanate-containing moiety, and a combination thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
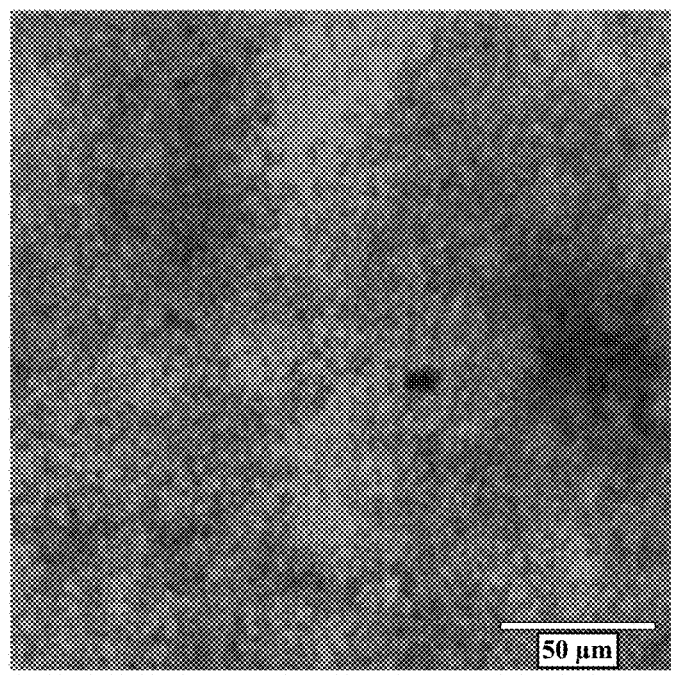

FIG. 2 is a confocal microscopy image of an odor mitigating coating made from a fluoroacrylate precursor, cyclodextrins, and a polymeric crosslinker. The more fluorescent green areas represent cyclodextrin rich portions of the coating. This image confirms phase separation that makes both material interact at the surface to provide both properties simultaneously. A scale bar is on the lower right of the image.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

Figure 1A:
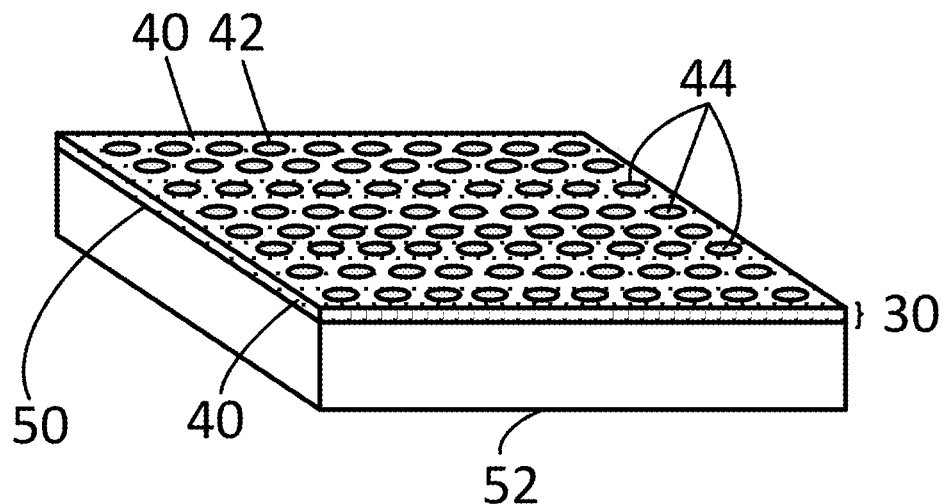
FIG. 1A is a schematic illustrating an example of a surface of an article coated with a heterophasic thermoset polymeric coating prepared according to various aspects of the present disclosure.
Figure 1B:
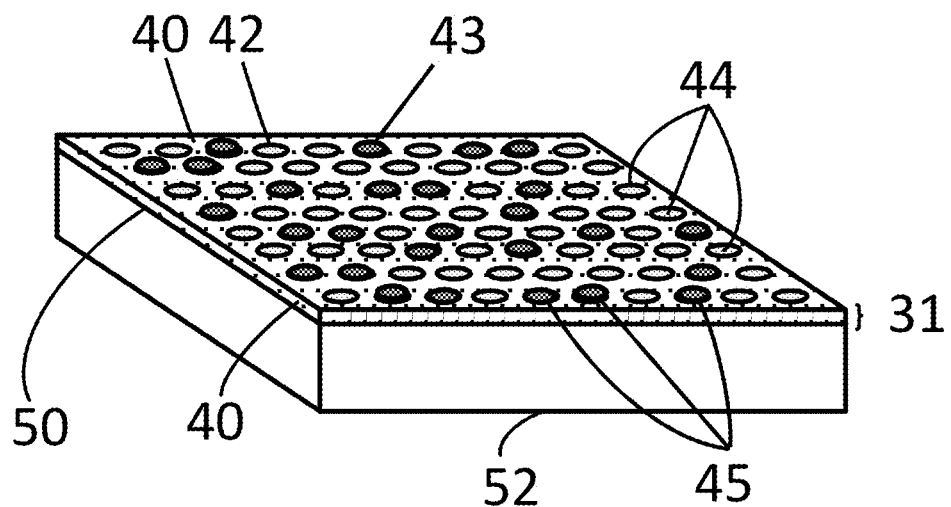
FIG. 1B is a schematic illustrating an example of a surface of an article coated with a heterophasic thermoset polymeric coating prepared according to various other aspects of the present disclosure.

In various aspects, as shown in FIG. 1A, the present disclosure pertains to a heterophasic thermoset polymeric coating 30 that has a continuous phase 40 and a first discrete or first discontinuous phase 42 and serves as an odor-absorbing and anti-fouling coating to minimize odors and adhesion of foreign matter, such as debris, soiling, and the like. The first discrete phase defines 42 a plurality of first domains 44 of relatively small size distributed within the continuous phase 40. For example, in certain variations, such first domains 44 have an average size of greater than or equal to about 100 nm to less than or equal to about 5,000 nm or greater than or equal to about 500 nm to less than or equal to about 5,000 nm. In further aspects, as shown in FIG. 1B, the present disclosure pertains to a heterophasic thermoset polymeric coating 31 that has a continuous phase 40, a first discrete or first discontinuous phase 42, and optionally a second discrete or second discontinuous phase 43 and serves as an odor-absorbing and anti-fouling coating to minimize odors and adhesion of foreign matter, such as debris, soiling, and the like. The second discrete phase 43 defines a plurality of second domains 45 of relatively small size distributed within the continuous phase 40. For example, in certain variations, such second domains 45 have an average size of greater than or equal to about 100 nm to less than or equal to about 5,000 nm or greater than or equal to about 500 nm to less than or equal to about 5,000 nm.

In certain aspects, the plurality of first domains 44 and plurality of second domains 45 are each substantially evenly or homogeneously distributed within the continuous phase 40. The continuous phase 40 can include a fluorine-containing polymer component as a first phase or a first component as a second phase, which may be a first fluorine-free polymer component. The first discrete phase 42 can include a fluorine-containing polymer component as a first phase or a first component as a second phase, which may be a first fluorine-free polymer component. In other words, the fluorine-containing polymer component can be present as the continuous phase 40 and the first component can be present as the first discrete phase 42 or the first component can be present as the continuous phase 40 and the fluorine-containing polymer component can be present as the first discrete phase 42. The first component is substantially immiscible with the fluorine-containing polymer component. Further, at least a portion of the first component can be bonded together with a moiety selected from the group consisting of a nitrogen-containing moiety, an oxygen-containing moiety, an isocyanate-containing moiety, and a combination thereof.

Additionally or alternatively, the continuous phase 40, the first discrete phase 42, or both can include a second component, which may be a second fluorine-free polymer component. For example, if the continuous phase 40 includes a first component, the second component may also be present in the continuous phase 40 with and/or intermixed with the first component. Additionally or alternatively, the second component can be present in the second discrete phase 43, for example, as a third phase. The second component is substantially immiscible with the fluorine-containing polymer component. Further, at least a portion of the second component can be bonded together and/or bonded with the first component with a moiety selected from the group consisting of a nitrogen-containing moiety, an oxygen-containing moiety, an isocyanate-containing moiety, and a combination thereof.

The heterophasic thermoset polymeric coatings 30, 31 are disposed on a surface 50 of an article 52 and thus provides odor-absorbing and anti-fouling properties to the article 52. It should be noted that FIGS. 1A and 1B are merely an illustrative simplified schematic and is not to scale, as the plurality of first domains and/or the plurality of second domains are in fact much smaller than those shown and may be distributed not only at the surface, but within/throughout the bulk of the continuous phase 40.

The present technology thus provides an odor-absorbing and anti-fouling coating having discrete, separated areas of fluorinated material and first component and/or second component material exposed on the surface. The fluorinated material is a low surface energy material (<38 mN/m) that inhibits wetting and adhesion while the second, immiscible chemistry (e.g., a second component) can absorb and store odor molecules and optionally include a third component that breaks up the contact line of the foreign matter, such as soil, along the surface and allows a cleaning solution to undercut a stain on the surface. Low surface energy materials are understood to have a surface tension or energy of less than or equal to about 38 mN/m. Fluorinated low surface energy materials can include "polyfluoroethers," or polymers that contain an ether group having an oxygen atom bonded to two alkyl or aryl groups, where at least one hydrogen atom is replaced in the alkyl or aryl group by a fluorine atom. "Perfluoropolyethers" (PFPE) are a subset of polyfluoroethers that generally refers to a linear polyfluoroether having all hydrogen atoms in the alkyl or aryl groups being replaced by fluorine atoms. Previous thermoplastic anti-fouling coatings generally have used expensive perfluoropolyethers (PFPE), which are linear polymers with oxygen linkages in the backbone. These types of anti-fouling coatings thus serve to break adhesion of foreign matter, such as debris and soils, on the surface as compared to a fluorinated material coating alone or a coating having inclusions of larger sizes and/or of uneven distribution.

While earlier anti-fouling coatings having a continuous matrix with a plurality of low surface energy inclusions have been formed, these coatings may potentially suffer from certain drawbacks. Such earlier coatings were thermoplastics that are less robust than thermoset coatings and further have relatively large domains of inclusions within a low surface energy polymeric matrix. In contrast, the present technology provides an odor-absorbing and anti-fouling coating having a substantially even distribution of a plurality of relatively small domains of a fluorine-containing polymer component, a first component, and/or optionally a second component, which is more desirable to minimize adhesion of any debris with the coating. Moreover, in accordance with various aspects of the present disclosure, the coatings prepared in accordance with the present teachings are environmentally friendly and can be made with a water-borne precursor liquid that comprises water and thus minimizes and/or avoids use of volatile organic compounds/non-aqueous solvents.

In certain aspects, an odor-absorbing and anti-fouling coating creates a first phase, which can be a continuous phase or a first discrete phase, from a multifunctional fluorine-containing precursor, such as a multifunctional fluorine-containing polyol. The fluorine-containing precursor has a functionality of greater than two (2). By a functionality of greater than 2, it is meant that each single precursor molecule has an average of greater than 2 functional groups, such as a hydroxyl group or other functional groups (for example, having an average of 3 or 4 hydroxyl groups per molecule) that react to form a cross-linked fluorine-containing polymer network. The functional groups may be distributed along the backbone of a fluoropolymer, rather than only being present on a terminal end of an oligomer or polymer chain. In certain variations, such a precursor unit may have an average hydroxyl value of less than or equal to about 20 mg KOH/resin g (equivalent weight (EW)=200 g/mol). In certain variations, the fluorine-containing precursor is a branched molecule and when incorporated into the fluorine-containing polymer network provides a branched polymer.

As will be discussed in detail below, a multifunctional fluorine-containing precursor having a functionality of greater than 2, such as a fluorine-containing polyol precursor, reacts to form a cross-linked fluorine-containing polymer network that defines a first phase, e.g., a continuous phase or a first discrete phase, in the heterophasic thermosetting odor-absorbing and anti-fouling polymeric coatings. In certain aspects, the branched fluorine-containing polymer network has a relatively high crosslink density. Such a heterophasic thermosetting polymeric coating has not only an improved durability, but an enhanced ability to absorb odors and repel foreign matter from the coated surface.

In other variations, a multifunctional fluorine-containing precursor having a functionality of greater than 2, such as a fluorine-containing polyol precursor, and a first precursor comprising cyclodextrins and/or precursors (e.g., monomers) that can form cyclodextrins can react with pendant groups off the backbone of a polymeric isocyanate. The fluorinated groups can crosslink the structure while the cyclodextrins can be present as pendant molecules bonded to the polymeric isocyanate backbone.

Notably, it is difficult to control the size of phase-separated domains when using a multifunctional fluorinated polyol as precursors for a coating, because they bond to other polymer chains along their backbone due to the presence of functional groups therein, instead of bonding only at the terminal end of each chain. In certain aspects, terminal end bonding can promote the chain coiling into a domain size controlled by length of the precursor, such as PFPE precursor. Thus, the high degree of functionality along the backbone of the fluorinated-based polymer increases disorder in the polymer network, making it hard to predict phase separation and difficult to control the size and distribution of the domains. Further, it is difficult to control uniformity in forming phase-separated domains when the precursors are water-borne, due to potential instabilities in the precursor system when it is water-borne and contains water, as compared to a solvent-borne precursor that contains non-aqueous solvents.

However, in accordance with the present disclosure, a coating is provided that contains two chemically distinct microphase separated materials, which enables both materials to be provided along an exposed surface and thus in contact with an odor molecule and/or a foreign agent on the surface, while the chemically distinct nature of the two chemistries allows for adsorption of the odor molecule and can also inhibits adhesion of the foreign agent (e.g., soils) to the surface (or into the absorbed odor causing molecules). The present disclosure contemplates a combination of non-miscible chemical functions and controlled phase separation when using a branched fluorinated polyol with a functionality of greater than 2 that can produce a highly crosslinked network due to the high level of hydroxyl groups found throughout the backbone of the fluorinated polymer. Moreover, such a controlled heterophasic coating is capable of being formed via a precursor that is water-based and contains water. In certain aspects, as described further herein, the anti-fouling heterophasic thermoset polymeric coating can be formed on a substrate and delivered as an environmentally friendly water-borne formulation.

In various aspects, the present disclosure provides a heterophasic thermoset polymeric coating that includes a first phase comprising a fluorine-containing polymer network formed at least in part from a multifunctional fluorine-containing precursor having a functionality of greater than 2. A fluorine-containing precursor may have greater than two functional groups represented by —XH, were X=O or NH. In certain aspects, the fluorine-containing polymer network is branched and/or cross-linked. In certain variations, a first phase comprises a branched fluorine-containing polymer component/network is formed at least in part from a fluorine-containing polyol precursor having a functionality of greater than 2, meaning that the precursor comprises one or more carbon-fluorine bonds and more than two hydroxyl groups (where X=O).

In certain aspects, the fluorine-containing polyol precursor is functionalized with more than two hydroxyl groups per unit (e.g., a monomer). The fluorine-containing precursor is advantageously soluble or dispersible in water, for example micelle stabilized with surfactants. The fluorine-containing polyol precursor also comprises fluorine and carbon units. In certain aspects, the monomer may comprise polyvinylidene fluoride/polyvinylidene difluoride (PVDF). In one variation, the fluorine-containing polyol precursor may comprise a polyvinylidene difluoride copolymer. In one aspect, the fluorine-containing polyol precursor may have an average hydroxyl value of less than or equal to about 25 mg KOH/resin g (equivalent weight (EW)=approximately 179 g/mol). By way of example, a suitable water-borne fluorine-containing PVDF polyol precursor is ZEFFLE S-7560 from Daikin. In certain variations, the fluorine-containing polyol precursor may comprise a fluoroacrylate monomer. One suitable acrylate-based fluorine-containing polyol precursor is a C6 based non-ionic fluorocarbon commercially available as EVOPROTECT™ ESA from DyStar.

In certain aspects, the multifunctional fluorine-containing polymer is formed from a monomer comprising PVDF or fluoroacrylate, where the polymer has an average molecular weight, such as weight average molecular weight ($M_w$) of greater than or equal to 2,000 g/mol to less than or equal to about 50,000 g/mol and in certain variations, optionally of greater than or equal to 10,000 g/mol to less than or equal to about 50,000 g/mol. Such molecular weight can be measured by GPC or NMR (end-group analysis), as appreciated by those of skill in the art. As discussed further below, the fluorine-containing polyol precursor is reacted to form a branched fluorine-containing polymer component/network, which defines a continuous phase in the present anti-fouling thermoplastic polymeric coatings.

In certain other alternative aspects, the fluorine-containing precursor with a functionality of greater than about 2 may include other monomers aside from fluoroacrylates and/or vinylidene fluoride, including by way of example, precursors selected from the group consisting of: tetrafluoroethylene, perfluoroethers, fluorosiloxane, trifluoroethylene, vinyl fluoride, hexafluoropropylene, perflluoropropylvinylether, perfluoromethylvinylether, and a combination thereof.

The branched fluorine-containing polymer component/network in the coating may include a fluoropolymer selected from the group consisting of a polyvinylidene fluoride copolymer, a polyfluoroacrylate, a polytetrafluoroethylene copolymer, a perfluoropolyether, a polyfluorosiloxane, a polytrifluoroethylene, and a combination thereof. In certain aspects, the branched fluorine-containing polymer component may be formed in part from the fluorine-containing polyol as well as another distinct precursor/monomer, like those listed above. The branched fluorine-containing polymer component/network may be present in the heterophasic coating in an amount of greater than or equal to about 20% to less than or equal to about 95% by weight of the total heterophasic coating.

The heterophasic thermoset polymeric coating also includes a second phase, e.g., a continuous phase or a first discrete phase, that includes a first component, such as a first fluorine-free component. The first component may be formed from a suitable first precursor, for example, a first precursor capable of forming cyclodextrins, such as cyclodextrin monomers, or cyclodextrins. The first component is substantially immiscible with the fluorine-containing polymer component. A miscible material, such as a miscible polymeric material, is one that is capable of being intermixed with another distinct material on the molecular scale, while a substantially immiscible material cannot be intermixed or distributed into another distinct material, but instead forms distinct phases or layers from the main material, without additional manipulation or reaction within the matrix.

An immiscible first component comprises a cyclodextrin. As used herein, the term "cyclodextrin" includes any of the known cyclodextrins such as unsubstituted cyclodextrins containing from six to twelve glucose units, especially, alpha-cyclodextrin (α-cyclodextrin), beta-cyclodextrin (β-cyclodextrin), gamma-cyclodextrin (γ-cyclodextrin) and/or their derivatives and/or mixtures thereof. Alpha-cyclodextrin consists of six glucose units, beta-cyclodextrin consists of seven glucose units, and gamma-cyclodextrin consists of eight glucose units, wherein the glucose units are arranged in a ring. The interior of the ring is generally includes OH or OR groups, so it can be hydrophobic or very hydrophilic depending on the R group. The cyclodextrin can be substituted with one or more alkyl groups (e.g., methyl, ethyl, propyl, etc.), one or more hydroxyl groups (e.g., hydroxypropyl, hydroxyethyl, etc.) or a combination therefore. Examples of suitable cyclodextrins include, but are not limited to hydroxypropyl alpha-cyclodextrin, methylated alpha-cyclodextrin, methylated beta-cyclodextrin, hydroxyethyl beta-cyclodextrin, and hydroxypropyl betacyclodextrin. hydroxyalkyl cyclodextrin derivatives preferably have a degree of substitution of from about 1 to about 14, more preferably from about 1.5 to about 7, wherein the total number of OR groups per cyclodextrin is defined as the degree of substitution. Methylated cyclodextrin derivatives typically have a degree of substitution of from about 1 to about 18, preferably from about 3 to about 16. A known methylated beta-cyclodextrin is heptakis-2,6-di-O-methyl-β-cyclodextrin, commonly known as DIMEB, in which each glucose unit has about 2 methyl groups with a degree of substitution of about 14. A preferred, more commercially available methylated beta-cyclodextrin is a randomly methylated beta-cyclodextrin having a degree of substitution of about 12.6. In some embodiments, examples of suitable cyclodextrins include, but are not limited to α-cyclodextrin, β-cyclodextrin, hydroxypropyl-β-cyclodextrin, methyl-β-cyclodextrin, and combinations thereof.

Other exemplary cyclodextrins include, but are not limited to branched cyclodextrins such as maltose-bonded cyclodextrins; cationic cyclodextrins such as those containing 2-hydroxy-3(dimethylamino)propyl ether; quaternary ammonium, e.g., 2-hydroxy-3-(trimethylammonio)propyl ether chloride groups; anionic cyclodextrins, such as carboxymethyl cyclodextrins, cyclodextrin sulfates, and cyclodextrin succinylates; amphoteric cyclodextrins such as carboxymethyl/quaternary ammonium cyclodextrins; cyclodextrins wherein at least one glucopyranose unit has a 3-6-anhydro-cyclomalto structure, e.g., the mono-3-6-anhydrocyclodextrins.

The unique shape and physical-chemical properties of the cavity enable the cyclodextrin molecules to absorb (form inclusion complexes with) odor molecules, such as organic molecules or parts of organic molecules, which can fit into the cavity. Many odorous molecules can fit into the cavity including many malodorous molecules and perfume molecules. Cyclodextrin can absorb odor molecules and lower their vapor pressure so the odor will not be perceived.

In some embodiments, the cyclodextrin can be modified with a non-ionic surfactant bonded to the external hydroxyl groups on the cyclodextrin ring. For example, the non-ionic surfactant may include poly(ethylene glycol), poly(propylene glycol), alkylphenol ethyoxylates (available as Triton™ surfactants from Dow Chemical), fatty alcohol ethoxylates, or a combination thereof. In some embodiments, the inclusion of the non-ionic surfactant can result in cyclodextrin composition having a suitable cloud point to allow for deposition in a flow reaction.

In certain aspects, the first component is present in the coating in an amount of greater than or equal to about 5% to less than or equal to about 90% by weight of the total heterophasic coating, optionally greater than or equal to about 20% to less than or equal to about 90%, optionally greater than or equal to about 20% to less than or equal to about 50%.

The first discrete phase forms a plurality of first domains within the continuous phase that are stable and evenly distributed. Furthermore, each domain of the plurality of first domains has an average size of each domain of the plurality of first domains has an average size of greater than or equal to about 100 nm to less than or equal to about 5,000 nm, or greater than or equal to about 500 nm to less than or equal to about 5,000 nm within the continuous phase. By an average size of a domain, it is meant that at least one dimension of the discrete domain within the continuous matrix, such as a diameter if the domain forms a round shape or alternatively, a length or width, is in the range of ≥100 nm and ≤5,000 nm, ≥100 nm and ≤5,000 nm, and in certain aspects, optionally ≥1000 nm and ≤5,000 nm. In certain aspects, all of the dimensions of the first domain may be within the range of ≥100 nm and ≤5,000 nm. In certain other aspects, the plurality of first domains of the discrete phase is substantially evenly or homogeneously distributed throughout the continuous phase, meaning that the first domains are relatively evenly distributed within the continuous phase, while accounting for slight deviations in distances between respective domains. The substantially even distribution of the first domains ensures the ability of the coating to provide superior long-term odor-absorbing, anti-fouling and self-cleaning properties.

In some embodiments, at least a portion of the first component in the discrete phase is bonded together or cross-linked with a moiety selected from the group consisting of a nitrogen-containing moiety, an oxygen-containing moiety, an isocyanate-containing moiety, and a combination thereof. In some embodiments, from 2 to 6, preferably, 2 to 4, more preferably, 3 to 4 of the hydroxides present on the exterior of a cyclodextrin ring can react to form a cross-linked cyclodextrin. In other embodiments, at least a portion of the first component is present as pendant groups off a polymeric cross-linking moiety, such as an isocyanate moiety. In such embodiments, between 1 and 2 hydroxides may be reacted on each cyclodextrin.

Thus, the precursor of the heterophasic thermoset polymeric coating may include a crosslinking agent including a moiety selected from the group consisting of an amine moiety, a hydroxyl moiety, an isocyanate moiety, and a combination thereof. In certain aspects, the crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked crosslinkers, such as blocked isocyanates, carbodiimide crosslinkers, and a combination thereof. In certain aspects, the crosslinking agent promotes reaction between a portion of the fluorine-free component in the discrete phase and the branched fluorine-containing polymer component in the continuous phase. Therefore, in such embodiments, at least a portion of the fluorine-containing polymer component in the first phase and at least a portion of the first component in the second phase are bonded together with a moiety selected from the group consisting of a nitrogen-containing moiety, an oxygen-containing moiety, an isocyanate-containing moiety, and a combination thereof.

In any embodiment, the first phase (defined by the fluorine-containing polymer) is a continuous phase and the second phase (defined by the first component) is a first discrete phase within the continuous phase, wherein the first discrete phase comprises a plurality of first domains each having an average size of greater than or equal to about 100 nm to less than or equal to about 5,000 nm. Alternatively, the second phase (defined by the first component) is the continuous phase and the first phase (defined by the fluorine-containing polymer) is the first discrete phase within the continuous phase, wherein the first discrete phase comprises a plurality of first domains each having an average size of greater than or equal to about 100 nm to less than or equal to about 5,000 nm.

Additionally or alternatively, the heterophasic thermoset polymeric coating can also optionally include a second component, such as a second fluorine-free component. The second component may be formed from a suitable second precursor. The second component is substantially immiscible with the fluorine-containing polymer component. In some embodiments, the second component can be included or intermixed with the first component in the second phase, e.g., in the continuous phase or the first discrete phase. Additionally or alternatively, the second component can be present as third phase comprising a second discrete phase defined by a plurality of second domains.

In certain aspects, the second component may be a poly(alkene glycol) selected from the group consisting of: poly(ethylene glycol), poly(propylene glycol), poly(tetramethylene glycol), and a combination thereof. In certain variations, the second component is selected from the group consisting of a hygroscopic polymer, a hydrophobic polymer, an ionic hydrophilic precursor or polymer, an amphiphilic precursor or polymer, and a combination thereof.

In certain aspects, the hygroscopic polymer is selected from the group consisting of poly(acrylic acid), poly(alkylene glycols), such as polyethylene glycol, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof.

In other aspects, the hydrophobic polymer, which optionally may not be lipophobic, is selected from the group consisting of a polyalkylene glycol, such as poly(propylene glycol), poly(tetramethylene glycol), a polybutadiene, a polycarbonate, a polycaprolactone, a polyacrylic polyol, and a combination thereof. In certain variations, an amphiphilic polymer is a block polymer.

In one aspect, the second component may include an amphiphilic polymer selected from the group of block polymers including polyalkylene glycols, such as polyethylene-block-poly(propylene glycol) polymers. These amphiphilic polymers may include poloxamers, which are nonionic triblock copolymers, where a central hydrophobic moiety, like poly(propylene oxide), is flanked by hydrophilic moieties, like poly(ethylene oxide). Poloxamers include PLURONICS™ triblock polymers. In certain variations, the amphiphilic polymer may be a triblock copolymer comprising poly(ethylene glycol)/poly(ethylene oxide)(PEG/PEO) and poly(propylene oxide) (PPO/PPG) (commercially available as PLURONIC™ P123, 70% PPG). In other aspects, the amphiphilic polymer may be selected from polyethylene-block-poly(ethylene glycol) polymer, polyethylene glycol (PEG)-polylactic acid (PLA) diblock polymer, polyethylene glycol (PEG)-poly(lactic-co-glycolic acid) (PLGA) diblock polymer, polyethylene glycol (PEG)-polycaprolactone (PCL) diblock polymer, polyethylene glycol (PEG)-polyethylene (PE) diblock polymer, and polyethylene glycol (PEG)-polystyrene (PS) diblock polymer, copolymers, equivalents, and combinations thereof.

In yet other aspects, the second component may be a hydrophilic polymer or precursor with ionic charge that comprises monomers with an ionic charge, for example, comprising a pendant carboxylate group, an amine group, a sulfate group, a phosphate group, and a combination thereof. Such charged monomers may be inserted along the polymer backbone. Optionally, the hydrophilic polymer may include monomers with an ionic charge, which include fluorine. Thus, in some embodiments, the second component may be fluorinated.

In certain variations, a fluorine-free monomer, such as 2,2-bis(hydroxymethyl)propionic acid (DMPA) having a carboxylic acid group, is mixed with the fluorine-containing polymer that becomes part of the crosslinked polymer coating and thus defines a fluorine-free component, which defines a plurality of second domains. The plurality of second domains define a second discrete phase within the fluorine-containing polymer.

In certain aspects, the second component is present in the coating in an amount of greater than or equal to about 5% to less than or equal to about 90% by weight of the total heterophasic coating, optionally greater than or equal to about 20% to less than or equal to about 90%, optionally greater than or equal to about 20% to less than or equal to about 50%. The second component may have an average molecular weight (e.g., $M_w$) of greater than or equal to about 100 g/mol to less than or equal to about 15,000 g/mol and optionally the second component has an average molecular weight of greater than or equal to about 500 g/mol to less than or equal to about 5,500 g/mol.

The second component can form a plurality of second domains within the continuous phase (defined by the first phase or the second phase) that are stable and evenly distributed. The plurality of second domains define a second discrete phase in the continuous phase. Furthermore, each domain of the plurality of second domains has an average size of greater than or equal to about 100 nm to less than or equal to about 5,000 nm within the continuous phase. By an average size of a domain, it is meant that at least one dimension of the discrete domain within the continuous matrix, such as a diameter if the domain forms a round shape or alternatively, a length or width, is in the range of ≥100 nm and ≤5,000 nm and in certain aspects, optionally ≥500 nm and ≤5,000 nm. In certain aspects, all of the dimensions of the second domain may be within the range of ≥100 nm and ≤5,000 nm. In certain other aspects, the plurality of second domains of the discrete phase is substantially evenly or homogeneously distributed throughout the continuous phase, meaning that the second domains are relatively evenly distributed within the continuous phase, while accounting for slight deviations in distances between respective domains. The substantially even distribution of the second domains ensures the ability of the coating to provide superior long-term anti-fouling and self-cleaning properties.

At least a portion of the second component is bonded together with a moiety selected from the group consisting of a nitrogen-containing moiety, an oxygen-containing moiety, an isocyanate-containing moiety, and a combination thereof. Thus, the precursor of the heterophasic thermoset polymeric coating may include a crosslinking agent including a moiety selected from the group consisting of an amine moiety, a hydroxyl moiety, an isocyanate moiety, and a combination thereof. In certain aspects, the crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked crosslinkers, such as blocked isocyanates, carbodiimide crosslinkers, and a combination thereof. In certain aspects, the crosslinking agent as described above can promotes reaction between a portion of the second component (e.g. in the first domains, in the second domains or a combination thereof) with one or more of the first component and the branched fluorine-containing polymer component in the continuous phase. Therefore, in such embodiments, at least a portion of the second component is bonded together with a portion of the first component and/or a portion of the fluorine-containing polymer component with a moiety selected from the group consisting of a nitrogen-containing moiety, an oxygen-containing moiety, an isocyanate-containing moiety, and a combination thereof.

In one variation, the heterophasic thermoplastic polymeric coating comprises a branched fluorine-containing polymer component formed from a polyol copolymer of tetrafluoroethylene, a first component comprising a cyclodextrin, such as α-cyclodextrin, β-cyclodextrin, hydroxypropyl-β-cyclodextrin, methyl-β-cyclodextrin, and a combination thereof, an isocyanate-containing moiety, and optionally a second component comprising a polyalkylene glycol, such as polyethylene glycol and/or polypropylene glycol.

In another variation, the heterophasic thermoplastic polymeric coating comprises a branched fluorine-containing polymer component formed from a polyol copolymer of tetrafluoroethylene, a first component comprising a cyclodextrin, such as α-cyclodextrin, β-cyclodextrin, hydroxypropyl-β-cyclodextrin, methyl-β-cyclodextrin, and a combination thereof, an isocyanate-containing moiety, and optionally a second component comprising a comprising a siloxane.

In yet another variation, the heterophasic thermoplastic polymeric coating comprises a branched fluorine-containing polymer component formed from a polyol copolymer of tetrafluoroethylene, a first component comprising a cyclodextrin, such as α-cyclodextrin, β-cyclodextrin, hydroxypropyl-β-cyclodextrin, methyl-O-cyclodextrin, and a combination thereof, an isocyanate-containing moiety, and optionally a second component formed from an acrylic polyol.

In one variation, the heterophasic thermoplastic polymeric coating comprises a branched fluorine-containing polymer component formed from a polyol copolymer of tetrafluoroethylene, a first component comprising a cyclodextrin, such as α-cyclodextrin, β-cyclodextrin, hydroxypropyl-β-cyclodextrin, methyl-β-cyclodextrin, and a combination thereof, an isocyanate-containing moiety, and optionally a second component formed from an acrylic polyol and a polyalkylene glycol, such as polyethylene glycol and/or polypropylene glycol.

The thermoset heterophasic coating may further include at least one further agent or additive selected from the group consisting of an anti-oxidant, a hindered amine stabilizer, a particulate filler, a pigment, a dye, a plasticizer, a flame retardant, a flattening agent, an adhesion promotor, an acid (e.g., acetic acid, HCl, nitric acid, sulfuric acid, etc.), a base (e.g., NaOH, KOH, $NH_3$, $NH_4OH$, sodium carbonate, sodium bicarbonate, etc.), an anti-bacterial agent, an anti-fungal agent, an anti-static agent, and a combination thereof. Each agent may be present at less than or equal to about 5% by weight of the coating, optionally less than or equal to about 4% by weight of the coating, optionally less than or equal to about 3% by weight of the coating, optionally less than or equal to about 1% by weight of the coating, optionally less than or equal to about 1% by weight of the coating, and in certain aspects, optionally less than or equal to about 0.5% by weight of the coating. In certain aspects, the one or more agents are cumulatively present at less than or equal to about 10% by weight of the coating, optionally less than or equal to about 7% by weight of the coating, optionally less than or equal to about 5% by weight of the coating, optionally less than or equal to about 3% by weight of the coating, optionally less than or equal to about 2% by weight of the coating, and in certain aspects, optionally less than or equal to about 1% by weight of the coating.

The addition of stabilizers directly to polymers can help prevent oxidation, polymer chain scissions and crosslinking reactions caused by exposure to ultraviolet (UV) radiation or high temperatures. Anti-oxidants can be added to minimize or terminate oxidation caused by UV or heat. Hindered amines stabilizers can help minimize or prevent light-induced degradation of the polymer. Additionally, aryl (e.g., phenyl) groups may be added in the polymer chain or at the chain ends to increase thermal stability of the polymer.

The particulate fillers may be selected from, but not limited to, the group consisting of silica, alumina, silicates, talc, aluminosilicates, barium sulfate, mica, diatomite, calcium carbonate, calcium sulfate, carbon, wollastonite, and a combination thereof. The particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

Such additives may be incorporated into the heterophasic thermoset polymeric coating to alter the appearance of the coating. By way of example, colloidal silica may be added to a polymer coating at greater than or equal to about 0.5 weight % to less than or equal to about 5 weight % to reduce gloss.

The anti-bacterial and/or anti-fungal agents may be capable of killing odor causing bacteria. Examples of suitable anti-bacterial and anti-fungal agents include, but are not limited to quaternary ammonium salts, quaternary ammonium compounds that react into polyurethane chains, silver and zinc containing zeolites, and zinc salts.

In other aspects, the anti-fouling heterophasic thermoplastic polymeric coating may further include yet another third polymer as a block, which may be capable of physiosorbing onto specific surfaces. For example, such a third polymer block may be a polyurethane that hydrogen bonds with polyester and nylon surfaces.

In certain aspects, the present disclosure contemplates forming a water-borne liquid precursor of the heterophasic thermoset polymeric coating. The liquid precursor may include a fluorine-containing precursor having a functionality greater than about 2 that forms a fluorine-containing polymer component defining a first phase, e.g., a continuous phase or a first discrete phase, in the heterophasic thermoset polymeric coating, such as any of the examples described above. The fluorine-containing polymer component may be a branched fluorine-containing polymer component formed from a multifunctional branched fluorine-containing polyol precursor. The liquid precursor may also include a first precursor that forms a first component present as a second phase, e.g., a continuous phase or a first discrete phase. The first discrete phase comprises a plurality of first domains each having an average size of greater than or equal to about 100 nm to less than or equal to about 5,000 nm. The first precursor may form a first component, such as any of the examples described above. For example, the first precursor can be cyclodextrin monomers. The liquid precursor may also optionally include a second precursor that forms a second component present in the plurality of first domains. Additionally or alternatively, the second component may be present in the second phase and/or as a third phase comprising a plurality of second domains, which as noted above, may each have an average size of greater than or equal to about 100 nm to less than or equal to about 5,000 nm. The second domains define a discrete phase within the continuous phase in the heterophasic thermoset polymeric coating. The second precursor may form a second component, such as any of the examples described above. A crosslinking agent comprising a moiety selected from the group consisting of an amine moiety, a hydroxyl moiety, an isocyanate moiety, and a combination thereof may be included in the liquid precursor. The crosslinking agent may be any of those described above and is capable of bonding at least a portion of the fluorine-containing polymer component in the continuous phase with at least a portion of first component, at least a portion of the second component, if present, and a combination thereof. Additionally or alternatively, the crosslinking agent may also be capable of bonding or crosslinking the first component, bonding or crosslinking the second component, and/or bonding the first component with the second component.

A water-borne liquid precursor may be an aqueous precursor that includes water and optionally an aqueous solvent, such as polar solvents like methanol, ethanol, propanol, butanol, acetone, and the like. Notably, the term solvent more broadly encompasses carriers rather, than strictly solvating compounds capable of dissolving and forming a solution with all components in the precursor. To become water-borne, the various components may be emulsified in water, optionally using one or more surfactants, or chemically modified with ionic groups and/or hydrophilic groups to aid in emulsification and stabilization.

To form a water-borne formulation, the fluoropolymer component and optionally other components may be selected to be water-borne components or may be altered to be compatible with an aqueous system. For example, a solvent-borne precursor can be emulsified in water with surfactants. The solvent-borne precursor is mixed with the one or more surfactants of choice and stirred rapidly while adding water dropwise until the amount of solvent is less than or equal to 10 wt. %. The solution is continuously stirred with or without gentle (for example, approximately 30° C.) heating until a dispersion is obtained.

Alternatively, a solvent borne precursor is optionally chemically bonded to first precursor and/or the second precursor that enables water dispersibility, such as ionic and/or hydrophilic groups. Some examples include 2,2-bis(hydroxymethyl)propionic acid (DMPA), triethylene glycol, and polyethylene glycol.

Hence, in certain aspects, the aqueous precursor may also include non-aqueous solvents, which may be present as carriers for one or more of the starting materials, by way of non-limiting example. When present, a non-aqueous solvent is selected from the group consisting of n-butyl acetate, methyl ethyl ketone, acetone, methyl isobutyl ketone, methyl isopropyl ketone, methyl sec-butyl ketone xylene, tetrahydrofuran, cyclohexane, 2-butoxyethanol acetate, toluene, and a combination thereof. In certain aspects, water is present at greater than or equal to about 50% to less than or equal to about 80% by weight of the aqueous precursor. In certain aspects, the various precursors may be combined and the resin may be diluted with water, so that the resin is present at greater than or equal to about 1% to less than or equal to about 50% by weight of the water-borne liquid precursor.

In certain variations, the precursor liquid may comprise an emulsifier, such as a surfactant. Suitable surfactants include, but are not limited to, ionic surfactants, like sodium dodecyl sulfate (SDS), non-ionic surfactants, such as sorbitan esters (SPAN™), and polyethoxylated sorbitan esters (TWEEN™), and a combination thereof. The emulsifier(s)

are present at greater than or equal to about 0.05% to less than or equal to about 5% by weight of the liquid precursor.

In certain other aspects, the liquid precursor may optionally include a catalyst to promote reaction of the precursors. The catalyst may be selected from the group consisting of: dibutyl tin dilaurate, dimethyltin dineodecanoate, dioctyltin dineodecanoate, dioctyltin dilaurate, tin octoate, bismuth neodecanoate, bismuth octoate, and a combination thereof.

The liquid precursor may also include at least one further agent selected from the group consisting of an anti-oxidant, a hindered amine stabilizer, a particulate filler, a pigment, a dye, a plasticizer, a flame retardant, a flattening agent, an adhesion promotor, an acid, a base, an anti-bacterial agent, an anti-fungal agent, and a combination thereof, such as any of those described above.

The present technology is relevant to surface modification of various components susceptible to exposure to odors and soiling, especially those in automotive and other vehicle applications, by way of non-limiting example. For example, various automobile interior and exterior surfaces may be coated with the heterophasic thermoplastic polymeric coatings of the present teachings to have increased odor-absorbing capability and increase stain resistance and cleanability. The coatings may be applied to a variety of surfaces, including a surface of a material selected from the group consisting of fabric or textile, plastic, leather, glass, paint (e.g., a painted surface), metal, and a combination thereof.

Although automotive applications are generally discussed, the odor-absorbing and anti-fouling heterophasic thermoplastic polymeric coating may also be used in other applications such as other vehicle applications (e.g., motorcycles and recreational vehicles), in the aerospace industry (e.g., airplanes, helicopters, drones), nautical applications (e.g., ships, personal watercraft, docks), agricultural equipment, industrial equipment, and the like.

In certain variations, a method of treating an article is provided by the present disclosure. The article may include a wheel, a steering wheel, a lens, a sensor, such as LIDAR sensor or ultrasonic back-up sensor, glass (such as a window, a windshield, and the like), a plastic (such as hard plastics, like polycarbonate, vinyl), a fabric, a yarn, a leather surface, a painted surface, a window, a metal panel, and equivalents and combinations thereof.

The method may include (a) applying a precursor liquid to a surface of the article. The aqueous precursor liquid can be delivered as about 0.005 wt. % to about 30 wt. % solids, about 0.005 wt. % to about 15 wt. % solids, about 0.005 wt. % to about 5 wt. % solids, about 0.005 wt. % to about 2 wt. % solids, or about 0.01 wt. % to about 3 wt. % solids.

The precursor liquid or solution may be an emulsion. The precursor liquid includes a fluorine-containing precursor having a functionality greater than about 2 that forms a fluorine-containing polymer including those described above. The fluorine-containing polymer may be a branched fluorine-containing polymer component formed from a multifunctional branched fluorine-containing polyol precursor. The precursor liquid also includes a first precursor that form the first component including those described above, a crosslinking agent comprising a moiety selected from the group consisting of an amine moiety, a hydroxyl moiety, an isocyanate moiety, and a combination thereof including those described above, and water like those described above. The precursor liquid may also optionally include an acid or a base as described herein to adjust the pH of the aqueous precursor, for example, to a pH of about 2 to about 10, about 2 to about 8, or about 2 to about 6. The precursor liquid may also optionally include a second precursor that forms a second component including those described above. In such embodiments, the precursor liquid can have cloud point of less than or equal to about 80° C. or less than or equal to about 60° C.

In some embodiments, the precursor liquid can include a first mixture and a separate second mixture. The first mixture can include the first the first precursor and the crosslinking agent, wherein the first mixture has a pH of about 2 to about 8. The separate second mixture can include the fluorine-containing precursor, wherein the second mixture has a pH of about 2 to about 6. Optionally, the third component can be included in the first mixture, the second mixture, or both. Upon mixing the first mixture and the second mixture, the pH can be adjusted to about 2 to about 8 or about 2 to about 6.

In certain variations, an emulsifier is present like those described above. Further, other solvents, such as aqueous or polar solvents and non-aqueous or non-polar solvents may be included in the precursor liquid. The liquid precursor may also include at least one further agent selected from the group consisting of a catalyst, an anti-oxidant, a hindered amine stabilizer, a particulate filler, a pigment, a dye, a plasticizer, a flame retardant, a flattening agent, an adhesion promoter, an anti-bacterial agent, an anti-fungal agent, and a combination thereof, such as any of those described above. The applying of the precursor liquid to the surface may be any coating technique, including but not limited to, spraying, brushing, dip coating, doctor-blade coating, spin coating, pad applying, casting, printing, in a flow system, and the like. In one aspect, the precursor liquid may be applied by spraying onto the target regions of the surface.

In certain aspects, the method may also include preparing the precursor by mixing a water-borne fluorine-containing precursor with the first precursor, water, the crosslinking agent, optionally the second precursor, and an optional catalyst, and optionally adjusting the pH of the precursor liquid to about 2 to about 8, or about 2 to about 6, for example, by adding a suitable acid or base. In another variation, preparing the precursor may include emulsifying a solvent-borne fluorine-containing precursor with water and an emulsifier component to form the precursor comprising the fluorine-containing precursor and mixing the aqueous precursor with the first precursor, water, the crosslinking agent, optionally the second precursor, and an optional catalyst, and optionally adjusting the pH of the aqueous precursor liquid to about 2 to about 6, for example, by adding a suitable acid or base. The solvent-borne precursor may be mixed with one or more surfactants and stirred rapidly while adding water dropwise until the amount of solvent is less than or equal to about 10% by weight. The solution may be continuously stirred with or without a gentle heating (e.g., around 30° C.) until a dispersion is formed.

In yet another variation, preparing the precursor may include reacting the fluorine-containing precursor, where the fluorine-containing precursor is solvent-borne or water-borne, with a hydrophilic moiety, an ionic moiety, or a combination thereof to form a fluoropolymer and mixing the fluoropolymer with the first precursor, water, the crosslinking agent, optionally the second precursor, and an optional catalyst, and optionally adjusting the pH of the aqueous precursor liquid to about 2 to about 8, or about 2 to about 6, for example, by adding a suitable acid or base. Some examples of the hydrophilic or ionic moieties include 2,2-bis(hydroxymethyl)propionic acid (DMPA), triethylene glycol, and polyethylene glycol, that may be reacted with the solvent-borne fluorine-containing precursor.

In yet another variation, preparing the water-borne or aqueous precursor may include reacting the first precursor with the second precursor to form a oligomer precursor and mixing the fluorine-containing precursor, wherein the fluorine-containing precursor is water-borne, with the oligomer precursor, water, the crosslinking agent, and an optional catalyst, and optionally adjusting the pH of the aqueous precursor liquid to about 2 to about 6, for example, by adding a suitable acid or base.

Alternatively, the aqueous precursor liquid can include a first mixture as described herein and a second mixture as described herein. The first mixture can include the first precursor, the crosslinking agent, and water. This second mixture can include the second precursor, the crosslinking agent, and water. The first mixture may be applied to the surface of an article described herein followed by application of the second mixture. Alternatively, the first mixture and the second mixture may be mixed together to form a third mixture and optionally, the pH may be adjusted to about 2 to about 8 or about 2 to about 6. The third mixture may be applied onto a surface of an article and solidified as described below. In some embodiments, the first mixture can be physically blended into a surface of an article followed by application of the second mixture onto the article.

The method also further includes (b) solidifying the aqueous precursor liquid to form an odor-absorbing and anti-fouling heterophasic thermoplastic polymeric coating on the surface of the article. The solidifying may include heating the precursor material and/or applying energy, such as actinic radiation (e.g., ultraviolet radiation) or electron beam to facilitate a crosslinking reaction of the precursors and removal of the water and/or solvent(s). In certain variations, the water and/or solvent(s) may be evaporated or volatilized from the applied precursor material and then the material may be heated, for example in an oven or a reactor, to form the solid polymer. In certain variations, the methods may be environmentally friendly and may be substantially free of volatile organic compounds (VOC) or may significantly reduce VOC emissions. In one variation, no VOCs may be emitted during the coating process. In another variation, a low VOC process may have a VOC content of less than or equal to about 380 g/L, optionally less than or equal to about 250 g/L and in certain variations, optionally less than or equal to about 50 g/L.

In certain variations, the precursor liquid comprises a first mixture and a separate second mixture. The first mixture can be formed by reacting the first precursor with a nonionic surfactant as described herein. The second mixture can include the fluorine-containing precursor. The second mixture can be applied to a surface of the article and solidified to form a first coating and the first mixture can be reacted onto the first coating. For example, the second mixture can be blended into vinyl seating surfaces, polyester yarn, or (polypropylene, acrylonitrile butadiene styrene (ABS), or thermoplastic olefin) solid components, followed by reacting the first mixture onto the coating on the surface. Additionally or alternatively, the first mixture can be formed by reacting the first precursor with a nonionic surfactant as described herein then solids may be isolated from the reaction, which may be blended into another polymer, for example, a urethane finish system, ABS, thermoplastic olefin, and/or polyethylene terephthalate (PET).

The odor-absorbing and anti-fouling self-cleaning heterophasic thermoplastic polymeric coating thus formed includes a first phase, e.g., a continuous phase or a first discrete phase defining a plurality of first domains, including the fluorine-containing polymer component, which may be a branched fluorine-containing polymer, and a second component comprising the first component, e.g., a continuous phase or a first discrete phase defining a plurality of first domains, including all of those examples previously described above. The first component is substantially immiscible with the fluorine-containing polymer. Each domain of the plurality of first domains has an average size of greater than or equal to about 100 nm to less than or equal to about 5,000 nm within the continuous phase. The heterophasic thermoplastic polymeric coating can also optionally include a second component present in the second phase, e.g., a continuous phase or a first discrete phase defining a plurality of first domains, present as third phase defining a plurality of second domains, or a combination thereof. Each domain of the plurality of second domains has an average size of greater than or equal to about 100 nm to less than or equal to about 5,000 nm within the continuous phase. At least a portion of the fluorine-containing polymer component in the first phase can be bonded with: (i) at least a portion of the first component in the second phase, (ii) at least a portion of the second component in the second phase and/or the third phase, if present, (iii) or a combination thereof, via a moiety selected from the group consisting of a nitrogen-containing moiety, an oxygen-containing moiety, an isocyanate-containing moiety, and a combination thereof. Additionally or alternatively, at least a portion of the first component in the second phase can be bonded with at least a portion of the second component in the third phase, if present, via a moiety selected from the group consisting of a nitrogen-containing moiety, an oxygen-containing moiety, an isocyanate-containing moiety, and a combination thereof.

In certain variations, the heterophasic thermoset polymeric coating can scatter between about 10% and 50% of incident light, or about 10 to about 20% incident light. The aforementioned scattering of incident light is measured by forming a heterophasic thermoset polymeric coating as a film and measuring % transmission in a UV/VIS spectrometer as understood by one of ordinary skill in the art. Additionally or alternatively, the heterophasic thermoset polymeric coating can have an average light absorbency of greater than or equal to about 5% to less than or equal to about 100% per 0.01 cm thickness of the polymeric coating over a wavelength range of about 400 nm to about 800 nm, optionally greater than or equal to about 5% to less than or equal to about 35% per 0.01 cm thickness of the polymeric coating. In certain aspects, the heterophasic thermoset polymeric coating has an average light absorbency of greater than or equal to about 5% to less than or equal to about 100%, optionally greater than or equal to about 5% to less than or equal to about 35%, where the coating has a thickness of greater than or equal to about 50 μm to less than or equal to about 500 μm. In certain aspects, the branched fluorine-containing polymer component may be a highly crosslinked network having a relatively high crosslink density rendering it insoluble. Such a heterophasic thermosetting odor-absorbing and anti-fouling polymeric coating has not only an improved durability, but an enhanced ability to absorb odor molecules and repel foreign matter from the coated surface.

In certain variations, prior to applying the precursor liquid to the surface to be treated, an adhesion layer may be applied to the surface or an adhesion-promoting agent may be added to the liquid precursor to form an adhesion-promoting layer. Examples of suitable adhesion promotors include, but are not limited to, alkoxysilanes that create chemical groups on a surface that bond to polyols such as (3-Glycidyloxypropyl) trimethoxysilane (GPTMS), (3-Aminopropyl) triethoxysilane (APS), (3-Aminopropyl) triethoxysilane (APS) with (3,3,3-Trifluoropropyl) trimethoxysilane (FPTS), or (3-Aminopropyl) triethoxysilane (APS) with Trimethoxyphenylsilane (TMPS), and a combination thereof.

Various embodiments of the inventive technology can be further understood by the specific examples contained herein. Specific non-limiting Examples are provided for illustrative purposes of how to make and use the compositions, devices, and methods according to the present teachings.

EXAMPLES
The three cyclodextrins that were evaluated for odor adsorption in the below examples are shown below:
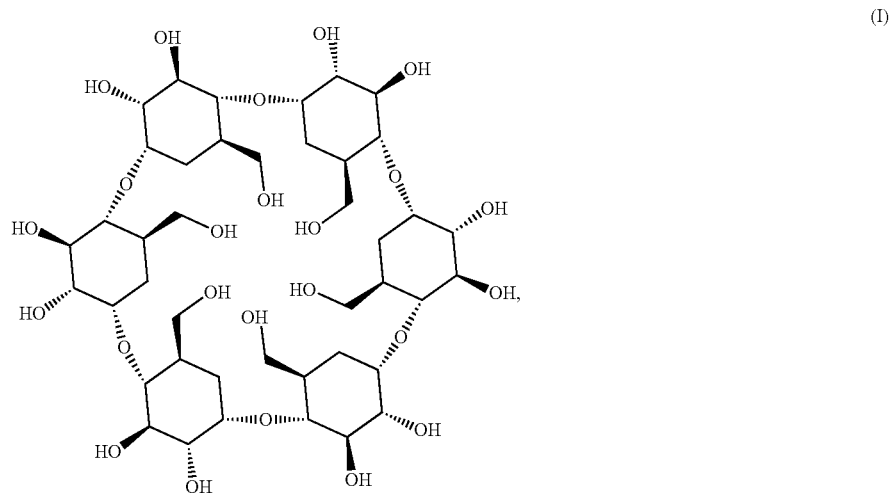
(I)
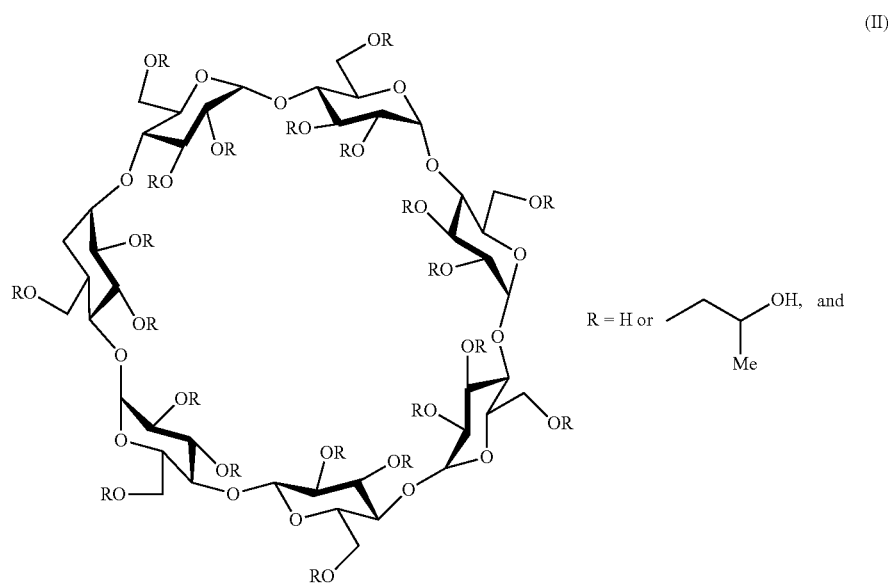
(II)
R = H or ⎯⎯⎯⎯OH, and
                    |
                    Me -continued

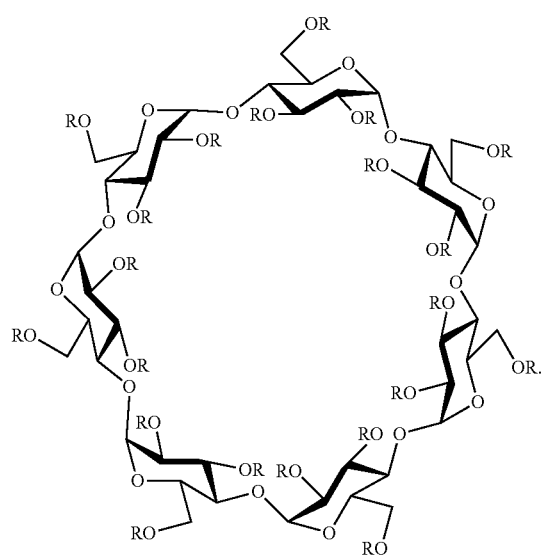

(III)

R = CH₃, or H

Cyclodextrin (I) is α-cyclodextrin; cyclodextrin (II) is Hydroxypropyl-β-cyclodextrin; and cyclodextrin (III) is methyl-β-cyclodextrin.

Example 1-Absorption of Odors with Free Cyclodextrins

Unless otherwise indicated in the examples, limonene was used an odor test molecule. In the present example, α-cyclodextrin was mixed with limonene in water (0.01 to 0.1 M) in a 2:1 and a 1:1 mole ratio of cyclodextrin to limonene, and the resulting odor was qualitatively measured as shown in Table 1.

TABLE 1

Odor absorption of free cyclodextrins.

| Cyclodextrin: limonene mole ratio | Odor strength after 1 day | Odor strength after 3 days |
|---|---|---|
| 2:1 | Barely perceptible odor | No odor |
| 1:1 | Slight odor | Barely perceptible odor |

TABLE 1-continued

Odor absorption of free cyclodextrins.

| Cyclodextrin: limonene mole ratio | Odor strength after 1 day | Odor strength after 3 days |
|---|---|---|
| Limonene control | Very strong odor | Very strong odor |
| Cyclodextrin control | No odor | No odor |

Example 2—Absorption of Odors with Crosslinked Cyclodextrin

The odor absorption of crosslinked cyclodextrins in water was tested. α-cyclodextrin and optionally hydroxypropyl-β-cyclodextrin were crosslinked into the samples shown in Table 2. To make polymer, cyclodextrins were dissolved in water with the Bayhydur emulsion, dried, and heated to 150° C. for 5 min to form a crosslinked polymer. We note that methyl-β-cyclodextrin was not tested because it became brown after crosslinking. After crosslinking, each polymer was mixed with 0.01 M aqueous limonene and the resulting odor was quantified as shown in Table 2. The mole ratios of cyclodextrin to limonene are shown in the column titles.

TABLE 2

Odor Absorption of Crosslinked Cyclodextrins. All ratios are mole ratios.

| α-cyclodextrin: hydroxypropyl-β-cyclodextrin mole ratio | Total cyclodextrin to isocyanate mole ratio | Odor strength after 1 day with 1:1 cyclodextrin: limonene | Odor strength after 3 days with 1:1 cyclodextrin: limonene | Odor strength after 1 day with 2:1 cyclodextrin: limonene | Odor strength after 3 days with 2:1 cyclodextrin: limonene |
|---|---|---|---|---|---|
| 1:0 | 2:3 | Slight odor | Barely perceptible odor | Faint (<slight) odor | No odor |
| 2:1.4 | 3.4:3 | Slight odor | Barely perceptible odor | Barely perceptible odor | No odor |

TABLE 2-continued

Odor Absorption of Crosslinked Cyclodextrins. All ratios are mole ratios.

| α-cyclodextrin: hydroxypropyl- β-cyclodextrin mole ratio | Total cyclodextrin to isocyanate mole ratio | Odor strength after 1 day with 1:1 cyclodextrin: limonene | Odor strength after 3 days with 1:1 cyclodextrin: limonene | Odor strength after 1 day with 2:1 cyclodextrin: limonene | Odor strength after 3 days with 2:1 cyclodextrin: limonene |
|---|---|---|---|---|---|
| 2:0.7 | 2.7:3 | Slight odor | Barely perceptible odor | Barely perceptible odor | No odor |
| 1:0 | 1:2 | Slight odor | Barely perceptible odor | Faint (<slight) odor | No odor |
| 2:1.4 | 5.1:6 | Slight odor | Barely perceptible odor | Barely perceptible odor | No odor |
| 2:0.7 | 4.05:6 | Slight odor | Barely perceptible odor | Barely perceptible odor | No odor |

The data in Table 2 shows that less odor was perceived when there was a 2:1 molar ratio of cyclodextrin:limonene versus a 1:1 molar ratio of cyclodextrin:limonene. This makes sense because there was more odor absorbing capacity when there were twice as many cyclodextrin molecules as limonene. Furthermore, mixtures of two types of cyclodextrins resulted in better initial odor reduction than just α-cyclodextrin alone when there was a 2:1 molar ratio of cyclodextrin:limonene. A sensory panel concluded that 1:1 α-cyclodextrin:hydroxypropyl-β-cyclodextrin with a 3.4:3 cyclodextrin to isocyanate mole ratio mitigated limonene odor best. These results show that polymerized cyclodextrins can absorb odors as well as discrete cyclodextrins

Example 3: Absorption of Odors on Fabric Coated with Crosslinked Cyclodextrins Cyclodextrins were mixed with Bayhydur polymeric crosslinker in an aqueous formulation, applied onto knit cloth, and cured into a fabric coating that absorbed limonene odor. The knit cloth was 140 denier yarn made from a cover yarn wrapped around a core yarn with 4 ends knit into cloth. The formulations shown in Table 3 were cured onto knit cloth and tested for odor mitigation. To test odor mitigation, limonene was deposited onto a cloth, the cloth was sealed in a closed jar at room temperature or at 30° C. for 24 hours, the cloth was removed and sat for one hour at room temperature, and then the cloth was evaluated by a sensory panel. Limonene was added at a 15:1 limonene:α-cyclodextrin molar ratio onto cloth and a piece of control cloth used the small mass of limonene as cyclodextrin coated cloth.

TABLE 3

Odor absorption of crosslinked cyclodextrins coated cloth. All ratios are mole ratios.

| α-cyclodextrin: hydroxypropyl-β- cyclodextrin mole ratio | Total cyclodextrin to isocyanate mole ratio | Odor strength after 1 day with 1:15 cyclodextrin:limonene at room temperature or at 30° C. |
|---|---|---|
| No cyclodextrin- control cloth | N/A | Potent odor |
| 2:1.4 | 3.4:3 | Barely perceptible odor |
| 2:1.4 | 5.1:6 | Faint odor |

The less crosslinked cyclodextrin coated fabric (3.4:3 total cyclodextrin to isocyanate mole ratio) best mitigated limonene odor. The results were the same after incubating the limonene dosed cloth at room temperature or at 30° C. The 30° C. result shows that these coatings will not release absorbed odors in a hot vehicle.

Example 4: Combining Cyclodextrins with Fluorine-Containing Polymers to Form Heterophasic Coating Coating formulations were made from a combination of 67.5 wt. % fluoroacrylate (EvoProtect ESA), 25 wt. % [α-cyclodextrin+hydroxypropyl-β-cyclodextrin combined in a 2:1.4 mole ratio], and 7.5 wt. % Bayhydur BL-2867. All weight percentages are on a solids basis. The formulation was diluted in water to 2 wt. % total solids and dried as films and cured, or applied on fabric and cured The cured formulation showed a phase separated structure as shown in FIG. 2. The film was soaked with fluorescent dye that preferentially goes into cyclodextrin areas and then imaged using a laser scanning confocal microscope. The more fluorescent green areas represent cyclodextrin rich portions of the coating. This image confirms phase separation that makes both material interact at the surface to provide both properties simultaneously. A scale bar is on the lower right of the image. 100 to 5,000 nm-sized domains of fluorinated (non-stick) chemistry are surrounded by a continuous cyclodextrin-containing matrix throughout the coating. This morphology presents both materials on the surface so cyclodextrins can adsorb odors while the fluorinated material repels soils.

Example 5: Optical Transmission Through Fluorinated-Cyclodextrin Phase Separated Coatings Further evidence of 100-5000 nm phase separation was shown looking at optical transmission of these materials Formulations 10 wt. % and 25 wt. % cyclodextrin in fluorinated+cyclodextrin+crosslinker coatings with a 3.4:3 cyclodextrin to isocyanate ratio and a 2:1.4 α-cyclodextrin: hydroxypropyl-β-cyclodextrin ratio were cured on glass slides. A crosslinked cyclodextrin sample with a 3.4:3 cyclodextrin to isocyanate ratio was made as a control without phase separation. All samples formed solid polymerized films and the neat crosslinked cyclodextrin, 10 wt. % cyclodextrin, and 25 wt. % cyclodextrin films are 30, 30, and 40 microns thick, respectively. When the optical transmission was evaluated, the transmission decreases with increasing amounts of phase separation. The greatest transmission is observed in the neat crosslinked cyclodextrin without phase separation that appears clear. As the cyclodextrin amount in a mixed fluorinated-cyclodextrin film increases from 10 to 25 wt. %, the transmission further decreases. This is because the amount of 100-5,000 nm-sized phase separation, and thus light scattering off of the 100-5,000 nm domains, increases with cyclodextrin content in a mixed fluorinated-cyclodextrin film. If the phase separation was on the 10-100 nm length scale, or if there was no phase separation in these coatings, cyclodextrin content would not affect optical transmission.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aqueous precursor liquid for forming an odor-absorbing and anti-fouling heterophasic thermoset polymeric coating, wherein the aqueous precursor liquid comprises:
   a fluorine-containing precursor having a functionality greater than about 2 that forms a fluorine-containing polymer component defining a first phase in the anti-fouling heterophasic thermoset polymeric coating;
   a first precursor that forms a first component comprising a cyclodextrin, wherein the first component defines a second phase in the odor-absorbing and anti-fouling heterophasic thermoset polymeric coating;
   a crosslinking agent comprising a moiety selected from the group consisting of an amine moiety, a hydroxyl moiety, an isocyanate moiety, and a combination thereof, wherein the crosslinking agent is capable of bonding at least a portion of the fluorine-containing polymer component in the first phase with at least a portion of the first component in the second phase;
   water; and
   optionally, an acid or a base;
   wherein the first phase is a continuous phase and the second phase is a first discrete phase within the continuous phase, wherein the first discrete phase comprises a plurality of first domains each having an average size of greater than or equal to about 100 nm to less than or equal to about 5,000 nm; or
   wherein the second phase is the continuous phase and the first phase is the first discrete phase within the continuous phase, wherein the first discrete phase comprises a plurality of first domains each having an average size of greater than or equal to about 100 nm to less than or equal to about 5,000 nm.

2. The aqueous precursor liquid of claim 1, wherein:
   (i) the fluorine-containing polymer component comprises a fluoropolymer selected from the group consisting of a polyvinylidene fluoride copolymer, a polyfluoroacrylate, a polytetrafluoroethylene copolymer, a fluorinated polyol, a perfluorocarbon, a perfluoropolyether, a polyfluorosiloxane, a polyvinylidene fluoride, a polytrifluoroethylene, and a combination thereof; and
   (ii) the cyclodextrin is selected from the group consisting of α-cyclodextrin, β-cyclodextrin, hydroxypropyl-β-cyclodextrin, methyl-β-cyclodextrin, and a combination thereof.

3. The aqueous precursor liquid of claim 1, further comprising a second precursor that forms a second component present:
   (i) in the second phase;
   (ii) as a third phase comprising a plurality of second domains each having an average size of greater than or equal to about 100 nm to less than or equal to about 5,000 nm defining a second discrete phase within the continuous phase in the odor-absorbing and anti-fouling heterophasic thermoset polymeric coating; or
   (iii) a combination thereof.

4. The aqueous precursor liquid of claim 3, wherein the second component is selected from the group consisting of a hygroscopic polymer, a hydrophobic polymer that is not lipophobic, an ionic hydrophilic precursor, an amphiphilic polymer, and a combination thereof, wherein:
   (a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof;
   (b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof;
   (c) the ionic hydrophilic precursor comprising a pendant carboxylate group, an amine group, a sulfate group, a phosphate group, and a combination thereof; and
   (d) the amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)-polylactic acid (PLA) diblock polymer, polyethylene glycol (PEG)-poly(lactic-co-glycolic acid) (PLGA) diblock polymer, polyethylene glycol (PEG)-polycaprolactone (PCL) diblock polymer, polyethylene glycol (PEG)-polyethylene (PE) diblock polymer, and polyethylene glycol (PEG)-polystyrene (PS) diblock polymer, and a combination thereof.

5. The aqueous precursor liquid of claim 4, wherein the aqueous precursor liquid has a cloud point of less than or equal to 80° C.

6. The precursor liquid of claim 1, wherein the aqueous precursor liquid comprises:
   a first mixture comprising the first precursor and the crosslinking agent, wherein the first mixture has a pH of about 2 to about 8; and
   a separate second mixture comprising the fluorine-containing precursor, wherein the separate second mixture has a pH of about 2 to about 6.

7. The aqueous precursor liquid of claim 1, further comprising at least one agent selected from the group consisting of an emulsifier, a catalyst, an anti-oxidant, a hindered amine stabilizer, a particulate filler, a pigment, a dye, a plasticizer, a flame retardant, a flattening agent, an adhesion promotor, an acid, a base, an anti-bacterial agent, an anti-fungal agent, and a combination thereof.

8. A method of treating an article comprising:
(a) applying an aqueous precursor liquid to a surface of the article, wherein the aqueous precursor liquid comprises:
a fluorine-containing precursor having a functionality greater than about 2;
a first precursor;
a crosslinking agent comprising a moiety selected from the group consisting of an amine moiety, a hydroxyl moiety, an isocyanate moiety, and a combination thereof;
water; and
optionally, an acid or a base; and
(b) solidifying the aqueous precursor liquid to form an odor-absorbing and anti-fouling thermoset polymeric coating on the surface of the article, wherein the odor-absorbing and anti-fouling thermoset polymeric coating comprises:
a first phase comprising a fluorine-containing polymer formed from the fluorine-containing precursor; and
a second phase comprising a first component formed from the first precursor, wherein the first component comprises a cyclodextrin and wherein the first component is substantially immiscible with the fluorine-containing polymer;
wherein at least a portion of the fluorine-containing polymer in the first phase and at least a portion of the first component in the second phase are bonded together with a moiety selected from the group consisting of a nitrogen-containing moiety, an oxygen-containing moiety, an isocyanate-containing moiety, and a combination thereof; and
wherein the first phase is a continuous phase and the second phase is a first discrete phase within the continuous phase, wherein the first discrete phase comprises a plurality of first domains each having an average size of greater than or equal to about 100 nm to less than or equal to about 5,000 nm; or
wherein the second phase is the continuous phase and the first phase is the first discrete phase within the continuous phase, wherein the first discrete phase comprises a plurality of first domains each having an average size of greater than or equal to about 100 nm to less than or equal to about 5,000 nm.

9. The method of claim 8, wherein:
(i) the first phase comprises a fluoropolymer selected from the group consisting of a polyvinylidene fluoride copolymer, a polyfluoroacrylate, a polytetrafluoroethylene copolymer, a perfluoropolyether, a polyfluorosiloxane, a polytrifluoroethylene, and a combination thereof; and
(ii) the cyclodextrin is selected from the group consisting of α-cyclodextrin, β-cyclodextrin, hydroxypropyl-β-cyclodextrin, methyl-β-cyclodextrin, and a combination thereof.

10. The method of claim 8, wherein the aqueous precursor liquid further comprises a second precursor; and
wherein the odor-absorbing and anti-fouling thermoset polymeric coating further comprises a second component present:
(i) in the second phase;
(ii) as a third phase comprising a plurality of second domains each having an average size of greater than or equal to about 100 nm to less than or equal to about 5,000 nm defining a second discrete phase within the continuous phase; or
(iii) a combination thereof; and
wherein at least a portion of the fluorine-containing polymer in the first phase is bonded with at least a portion of the first component in the second phase, at least a portion of the second component in the third phase, or a combination thereof, via a moiety selected from the group consisting of a nitrogen-containing moiety, an oxygen-containing moiety, an isocyanate-containing moiety, and a combination thereof.

11. The method of claim 10, wherein the second component is selected from the group consisting of a hygroscopic polymer, a hydrophobic polymer that is not lipophobic, an ionic hydrophilic precursor, an amphiphilic polymer, and a combination thereof, wherein:
(a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof;
(b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof;
(c) the ionic hydrophilic precursor comprising a pendant carboxylate group, an amine group, a sulfate group, a phosphate group, and a combination thereof; and
(d) the amphiphilic polymer is selected from the group consisting of poloxamers, a polyethylene-block-poly(ethylene glycol) polymer, poly(ethylene glycol) and poly(propylene oxide) triblock polymer, polyethylene glycol (PEG)-polylactic acid (PLA) diblock polymer, polyethylene glycol (PEG)-poly(lactic-co-glycolic acid) (PLGA) diblock polymer, polyethylene glycol (PEG)-polycaprolactone (PCL) diblock polymer, polyethylene glycol (PEG)-polyethylene (PE) diblock polymer, and polyethylene glycol (PEG)-polystyrene (PS) diblock polymer, and a combination thereof.

12. The method of claim 8, wherein:
(i) the crosslinking agent is selected from the group consisting of polyisocyanate, hexamethylene diisocyanate based monomers, isophorone diisocyanate based monomers, methylene diphenyl diisocyanate based monomers, toluene diisocyanate based monomers, blocked isocyanates, carbodiimide crosslinkers, and a combination thereof; and
(ii) the aqueous precursor liquid optionally comprises a catalyst selected from the group consisting of: dibutyl tin dilaurate, dimethyltin dineodecanoate, dioctyltin dineodecanoate, dioctyltin dilaurate, tin octoate, bismuth neodecanoate, bismuth octoate, and a combination thereof.

13. The method of claim 8, wherein the surface of the article comprises a material selected from the group consisting of glass, plastic, fabric, textile, yarn, leather, surface, paint, and a combination thereof.

14. The method of claim 8, wherein the aqueous precursor liquid optionally further comprises a second precursor and the method further comprises preparing the aqueous precursor liquid by:
- (i) mixing the fluorine-containing precursor, wherein the fluorine-containing precursor is water-borne, with the first precursor, water, the crosslinking agent, optionally the second precursor, and an optional catalyst, and optionally adjusting the pH of the aqueous precursor liquid to about 2 to about 8;
- (ii) emulsifying a water-borne fluorine-containing precursor with water and an emulsifier component to form the aqueous precursor liquid comprising the fluorine-containing precursor and mixing the aqueous precursor liquid with the first precursor, water, the crosslinking agent, optionally the second precursor, and an optional catalyst, and optionally adjusting the pH of the aqueous precursor liquid to about 2 to about 8;
- (iii) reacting the fluorine-containing precursor, wherein the fluorine-containing precursor is water-borne, with a hydrophilic moiety, an ionic moiety, or a combination thereof to form a fluoropolymer and mixing the fluoropolymer with the first precursor, water, the crosslinking agent, optionally the second precursor, and an optional catalyst, and optionally adjusting the pH of the aqueous precursor liquid to about 2 to about 8; or
- (iv) reacting the first precursor with the second precursor to form an oligomer precursor and mixing the fluorine-containing precursor, wherein the fluorine-containing precursor is water-borne, with the oligomer precursor, water, the crosslinking agent, and an optional catalyst, and optionally adjusting the pH of the aqueous precursor liquid to about 2 to about 8.

15. The method of claim 8, wherein the aqueous precursor liquid comprises a first mixture and a separate second mixture comprising the fluorine-containing precursor, wherein the first mixture is formed by reacting the first precursor with a nonionic surfactant;
wherein the second mixture is applied to a surface of the article and solidified to form a first coating and the first mixture is reacted onto the first coating; or
wherein the first mixture and the second mixture are combined to form a third mixture and the third mixture is applied to the surface of the article and solidified.

16. A heterophasic thermoset polymeric coating comprising:
a first phase comprising a fluorine-containing polymer component formed from at least one fluorine-containing precursor having a functionality of greater than 2; and
a second phase comprising a first component comprising a cyclodextrin, wherein the first component is formed from a first precursor, wherein the first component is substantially immiscible with the fluorine-containing polymer component, and at least a portion of the first component in the second phase is bonded together with a moiety selected from the group consisting of a nitrogen-containing moiety, an oxygen-containing moiety, an isocyanate-containing moiety, and a combination thereof, wherein the heterophasic thermoset polymeric coating is formed from an aqueous precursor comprising water, the fluorine-containing precursor, and the first precursor;
wherein the first phase is a continuous phase and the second phase is a first discrete phase within the continuous phase, wherein the first discrete phase comprises a plurality of first domains each having an average size of greater than or equal to about 100 nm to less than or equal to about 5,000 nm; or
wherein the second phase is the continuous phase and the first phase is the first discrete phase within the continuous phase, wherein the first discrete phase comprises a plurality of first domains each having an average size of greater than or equal to about 100 nm to less than or equal to about 5,000 nm.

17. The heterophasic thermoset polymeric coating of claim 16, wherein the at least one fluorine-containing precursor comprises a polyol fluoroacrylate or a polyol copolymer of polyvinylidene difluoride.

18. The heterophasic thermoset polymeric coating of claim 16, wherein the heterophasic thermoset polymeric coating scatters between about 10% and about 50% of incident light.

19. The heterophasic thermoset polymeric coating of claim 16, wherein:
- (i) the fluorine-containing polymer component comprises a fluoropolymer selected from the group consisting of a polyvinylidene fluoride, a polyfluoroacrylate, a polytetrafluoroethylene copolymer, a fluorinated polyol, a perfluorocarbon, a perfluoropolyether, a polyfluorosiloxane, a polytrifluoroethylene, and a combination thereof; and
- (ii) the cyclodextrin is selected from the group consisting of α-cyclodextrin, β-cyclodextrin, hydroxypropyl-β-cyclodextrin, methyl-β-cyclodextrin, and a combination thereof.

20. The heterophasic thermoset polymeric coating of claim 16, further comprising a second component formed from a second precursor, wherein the second component is present:
- (i) in the second phase; (ii) as a third phase comprising a plurality of second domains each having an average size of greater than or equal to about 100 nm to less than or equal to about 5,000 nm defining a second discrete phase within the continuous phase; or
- (iii) a combination thereof;

wherein the second component is selected from the group consisting of a hygroscopic polymer, a hydrophobic polymer that is not lipophobic, an ionic hydrophilic precursor, an amphiphilic polymer, and a combination thereof, wherein:
- (a) the hygroscopic polymer is selected from the group consisting of poly(acrylic acid), poly(alkene glycol) selected from the group consisting of poly(ethylene glycol), and a combination thereof, poly(2-hydroxyethyl methacrylate), poly(vinyl imidazole), poly(2-methyl-2-oxazoline), poly(2-ethyle-oxazoline), poly(vinylpyrolidone), a modified cellulose polymer selected from the group consisting of carboxymethyl cellulose, hydroxyethyl cellulose, hydroxypropyl cellulose, methyl cellulose, and a combination thereof;
- (b) the hydrophobic polymer is selected from the group consisting of a polyalkylene glycol selected from the group consisting of poly(propylene glycol), poly(tetramethylene glycol), a polybutadiene, a polycarbonate, a polycaprolactone, a polyacrylic polyol, and a combination thereof;
- (c) the ionic hydrophilic precursor comprising a pendant carboxylate group, an amine group, a sulfate group, a phosphate group, and a combination thereof; and
- (d) the amphiphilic polymer is selected from the group consisting of poloxamers, a polyethyleneblock-poly(ethylene glycol) polymer, poly(ethylene glycol) and poly(propylene oxide) triblock polymer, polyethylene glycol (PEG)-polylactic acid (PLA) diblock polymer, polyethylene glycol (PEG)-poly(lactic-co-glycolic acid) (PLGA) diblock polymer, polyethylene glycol (PEG)-polycaprolactone (PCL) diblock polymer, polyethylene glycol (PEG)-polyethylene (PE) diblock polymer, and polyethylene glycol (PEG)-polystyrene (PS) diblock polymer, and a combination thereof.

* * * * *